US010257093B2

(12) United States Patent
Kobayashi et al.

(10) Patent No.: US 10,257,093 B2
(45) Date of Patent: Apr. 9, 2019

(54) INFORMATION PROCESSING DEVICE, METHOD, AND MEDIUM

(71) Applicant: PFU LIMITED, Kahoku-shi, Ishikawa (JP)

(72) Inventors: Takashi Kobayashi, Kahoku (JP); Kazuhiro Koide, Kahoku (JP); Seigo Terada, Kahoku (JP)

(73) Assignee: PFU LIMITED, Ishikawa (JP)

( * ) Notice: Subject to any disclaimer, the term of this patent is extended or adjusted under 35 U.S.C. 154(b) by 278 days.

(21) Appl. No.: 14/683,620

(22) Filed: Apr. 10, 2015

(65) Prior Publication Data

US 2016/0191389 A1 Jun. 30, 2016

(30) Foreign Application Priority Data

Dec. 26, 2014 (JP) .................................. 2014-265806

(51) Int. Cl.
*H04L 12/801* (2013.01)
*H04L 12/851* (2013.01)

(52) U.S. Cl.
CPC .......... *H04L 47/10* (2013.01); *H04L 47/2483* (2013.01)

(58) Field of Classification Search
None
See application file for complete search history.

(56) References Cited

U.S. PATENT DOCUMENTS

| | | | | |
|---|---|---|---|---|
| 6,839,751 B1 * | 1/2005 | Dietz | .................. | H04L 12/2602 709/223 |
| 7,058,821 B1 * | 6/2006 | Parekh | .................. | H04L 63/145 713/194 |
| 8,135,029 B1 * | 3/2012 | Vasudevan | .............. | H04L 45/00 370/395.5 |
| 8,638,793 B1 | 1/2014 | Ben-Mayor et al. | | |
| 9,154,418 B1 * | 10/2015 | Ben-Mayor | ............. | H04L 45/38 |
| 2004/0205360 A1 * | 10/2004 | Norton | ................ | H04L 63/0227 726/23 |
| 2007/0297333 A1 * | 12/2007 | Zuk | ..................... | H04L 63/1416 370/235 |

(Continued)

FOREIGN PATENT DOCUMENTS

| JP | 2004-179999 A | 6/2004 |
| JP | 2008-011537 A | 1/2008 |

OTHER PUBLICATIONS

Office Action dated Apr. 26, 2018, issued in counterpart Chinese application No. 201510456152.7, with English translation. (21 pages).

(Continued)

Primary Examiner — James P Duffy
(74) Attorney, Agent, or Firm — Westerman, Hattori, Daniels & Adrian, LLP (57) ABSTRACT

An information processing device includes: a first analyzing unit which estimates whether or not a protocol related to a communication flow is a first protocol set in advance by analyzing, each time data is received, the data in accordance with characteristics of the first protocol; and a second analyzing unit which estimates whether or not the protocol related to the communication flow is a second protocol set in advance by analyzing, each time data belonging to the communication flow is received, the data in accordance with characteristics of the second protocol regardless of a result of analysis by the first analyzing unit.

9 Claims, 8 Drawing Sheets

(56) References Cited

U.S. PATENT DOCUMENTS

2012/0026881 A1  2/2012  Zuk et al.
2014/0075539 A1  3/2014  Zuk et al.

OTHER PUBLICATIONS

Office Action dated Jan. 30, 2019, issued in counterpart Chinese Application No. 201510456152.7, with English machine translation. (24 pages).

* cited by examiner

| FLOW ID | PROTOCOL | ANALYSIS STATUS | ANALYSIS CONTEXT |
|---|---|---|---|
| 1 | HTTP | ANALYZE | INFORMATION NECESSARY FOR INSPECTION (METHOD ID, CHARACTERISTIC OF CHARACTER STRING, VERSION INFORMATION, ETC) ITEM 1: INSPECTION ITEM ITEM 2: NOT INSPECTION ITEM ITEM 3: PENDING ⋮ |
| | FTP | DO NOT ANALYZE | ... |
| | ⋮ | ⋮ | ⋮ |
| 2 | HTTP | ANALYZE | ... |
| | FTP | DO NOT ANALYZE | ... |
| | ⋮ | ⋮ | ⋮ |

INFORMATION PROCESSING DEVICE, METHOD, AND MEDIUM

CROSS-REFERENCE TO RELATED APPLICATION

This application is based upon and claims the benefit of priority of the prior Japanese Patent Application No. JP2014-265806, filed on Dec. 26, 2014, the entire contents of which are incorporated herein by reference.

FIELD

The present disclosure relates to a technique for determining a protocol.

BACKGROUND

Conventionally, a trespass detecting device has been proposed that includes: a data segment assembling unit which, when a packet from an external network is a communication by TCP, temporarily stores a copy of a data segment included in the packet in association with session information and, upon receiving a packet including a data segment which is the same as a data segment in the session information and which is a last data segment, assembles data segments including the same session information; and an unauthorized access analyzing unit which analyzes a received data segment or assembled data segments and, when an unauthorized access is included, discards a packet including the last received data segment (refer to Japanese Patent Application Laid-open No. 2004-179999).

In addition, a data packet inspection method has been proposed which classifies received data packets using information included in headers and contents of the data packets, decides a flow instruction for processing the packets based on both the header information and the contents, and processes the packets using the flow instruction (refer to Japanese Patent Application Laid-open No. 2008-011537).

SUMMARY

An example of the present disclosure is an information processing device including: flow managing means for identifying a communication flow to which acquired data belongs; first analyzing means for estimating whether or not a protocol related to the communication flow is a first protocol set in advance by analyzing, each time data belonging to the communication flow is received, the data in accordance with characteristics of the first protocol; and second analyzing means for estimating whether or not the protocol related to the communication flow is a second protocol set in advance by analyzing, each time data belonging to the communication flow is received, the data in accordance with characteristics of the second protocol regardless of a result of analysis by the first analyzing means, wherein when a result of analysis of the data belonging to the communication flow satisfies one or any of a plurality of discontinuation conditions, the flow managing means discontinues analysis of data related to the communication flow performed by the first analyzing means or the second analyzing means.

The present disclosure may be viewed as an information processing device, a system, a method that is executed by a computer, and a program to be run on a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

DESCRIPTION OF EMBODIMENTS

Hereinafter, an embodiment of an information processing device, a method, and a program according to the present disclosure will be described with reference to the drawings.

It should be noted that the embodiment described below merely exemplifies the present disclosure and is not intended to limit an information processing device, a method, and a program according to the present disclosure to the specific configuration described below. When implementing the present disclosure, a specific configuration may be adopted as appropriate in accordance with each embodiment. In addition, various improvements and modification may be made to the present disclosure.

As the present embodiment, an embodiment in which an information processing device, a method, and a program according to the present disclosure are implemented in a system for monitoring a network will be described. However, an information processing device, a method, and a program according to the present disclosure can be widely used with respect to techniques for determining protocols. Accordingly, objects of application of the present disclosure are not limited to the examples described in the present embodiment.

<Configuration of System>

Figure 1:
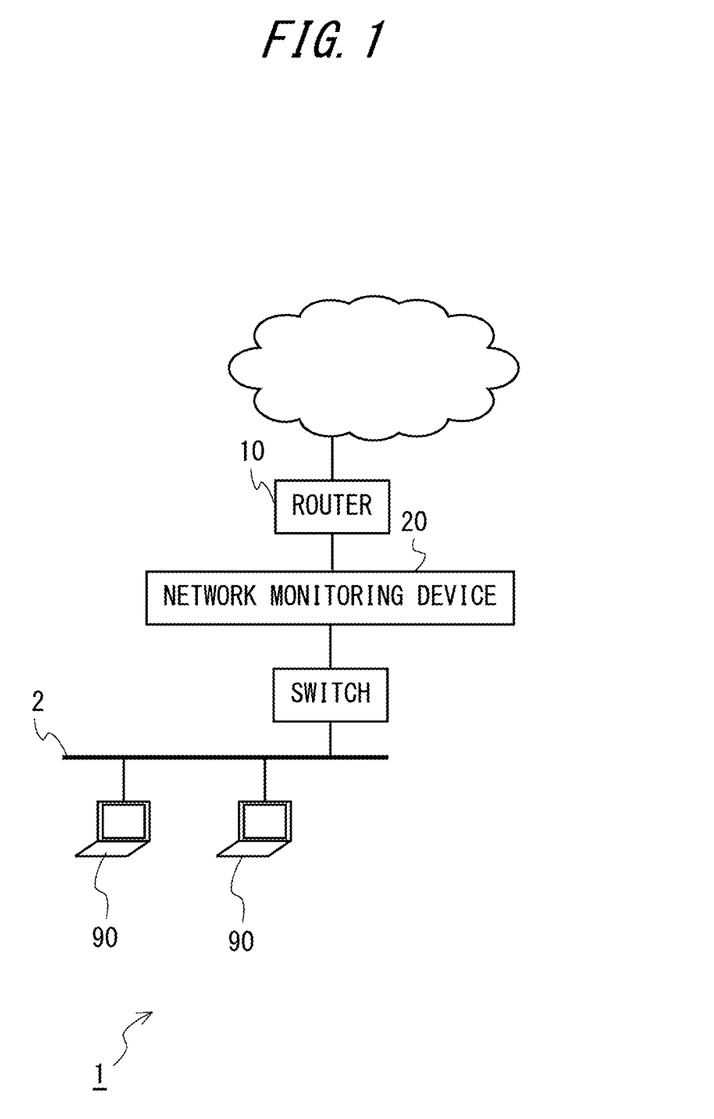
FIG. 1 is a schematic diagram showing a configuration of a system according to an embodiment.

FIG. 1 is a schematic diagram showing a configuration of a system 1 according to the present embodiment. The system 1 according to the present embodiment includes a network segment 2 to which a plurality of information processing terminals 90 (hereinafter, referred to as "nodes 90") are connected and a network monitoring device 20 for monitoring communication related to the nodes 90. In addition, the nodes 90 in the network segment 2 are capable of communicating, via a router 10, with various servers connected at remote locations via the Internet or wide area networks. In the present embodiment, the network monitoring device 20 acquires packets, frames, and the like which pass through the network monitoring device 20 by being connected between a switch or a router (the router 10 in the example shown in FIG. 1) of the network segment 2 and another switch or router that is hierarchically above the switch or the router of the network segment 2. In this case, the network monitoring device 20 runs in an in-line mode in which packets that need not be blocked among acquired packets are transferred.

Figure 2:
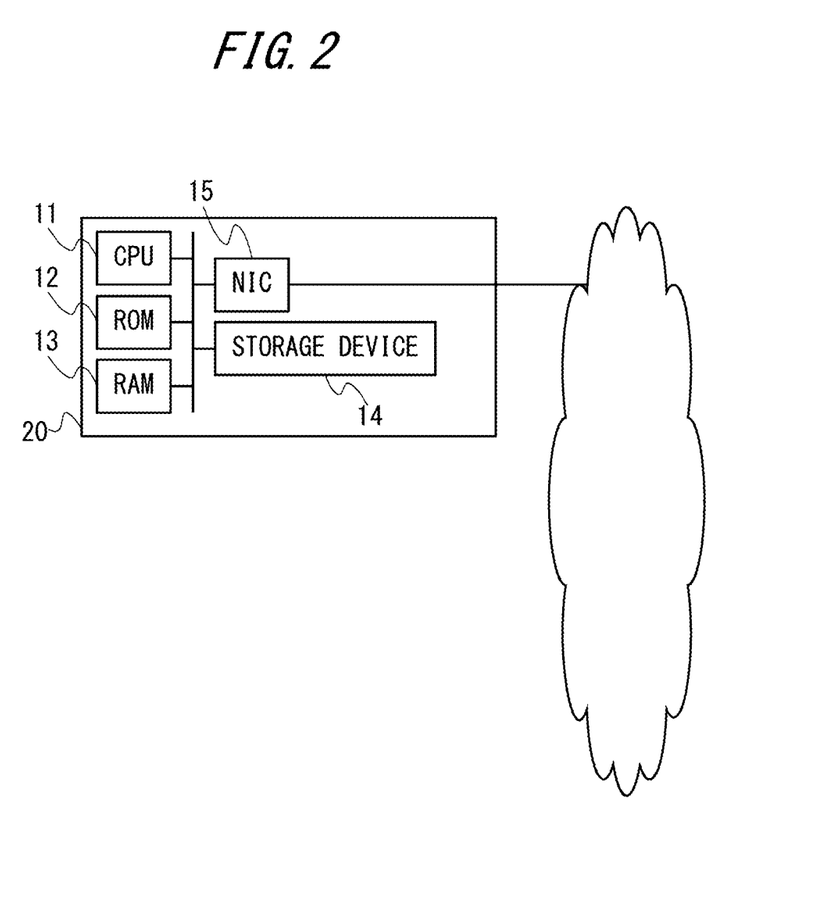
FIG. 2 is a diagram showing a hardware configuration of a network monitoring device according to an embodiment.

FIG. 2 is a diagram showing a hardware configuration of the network monitoring device 20 according to the present embodiment. It should be noted that, in FIG. 2, components other than the network monitoring device 20 (the router 10, the nodes 90, and the like) have been omitted. The network monitoring device 20 is a computer including a central processing unit (CPU) 11, a Random access memory (RAM) 13, a Read Only Memory (ROM) 12, a storage device 14 such as an electrically erasable and programmable Read only memory (EEPROM), a hard disk drive (HDD), or the like, a communicating unit such as an network interface card (NIC) 15, and the like.

Figure 3:
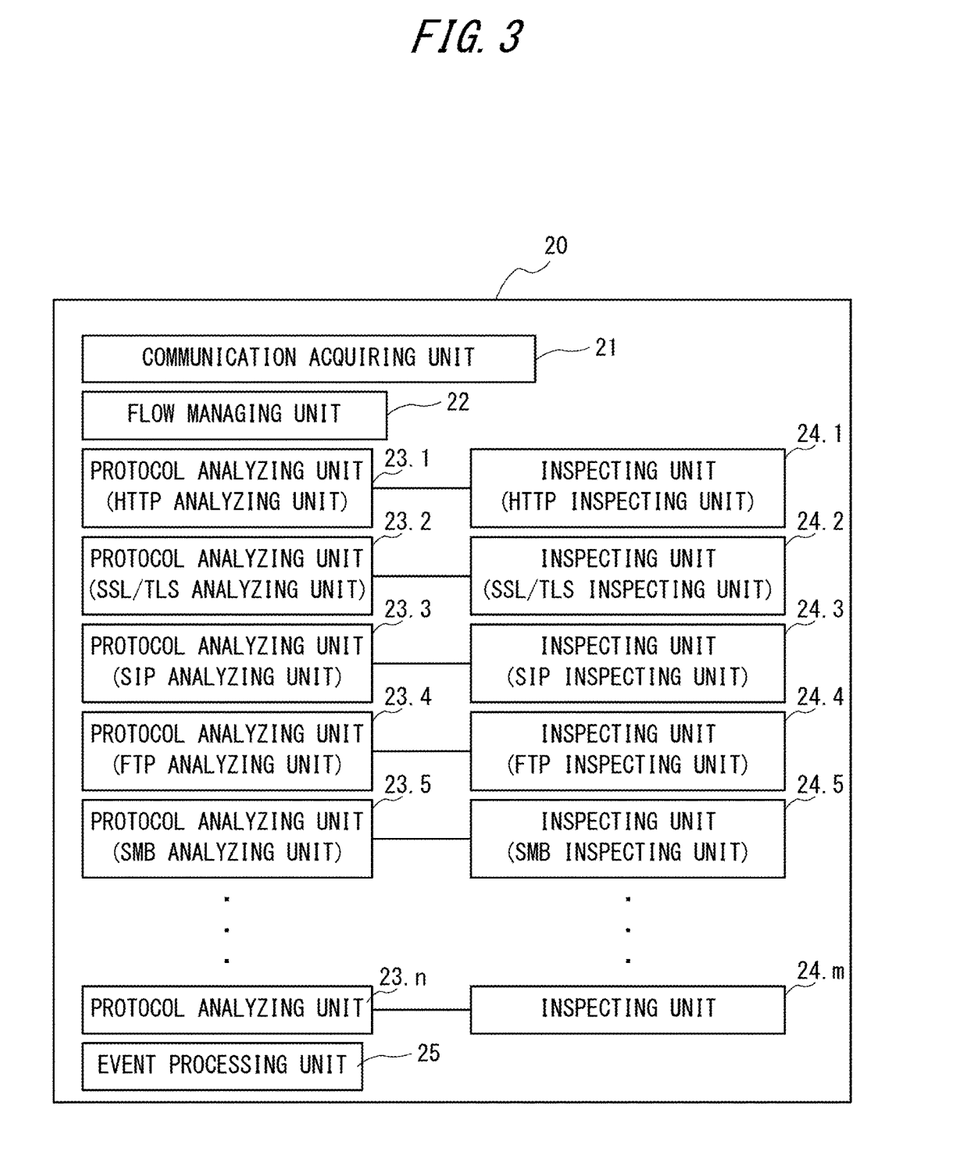
FIG. 3 is a diagram showing an outline of a functional configuration of a network monitoring device according to an embodiment.

FIG. 3 is a diagram showing an outline of a functional configuration of the network monitoring device 20 according to the present embodiment. It should be noted that, in FIG. 3, components other than the network monitoring device 20 (the router 10, the nodes 90, and the like) have been omitted. By having a program recorded in the storage device 14 be read out to the RAM 13 and executed by the CPU 11, the network monitoring device 20 functions as an information processing device including a communication acquiring unit 21, a flow managing unit 22, a plurality of protocol analyzing units 23.1 to 23.*n* (when simply referring to any one of the protocol analyzing units, the protocol analyzing units will be simply described as the "protocol analyzing unit 23"), a plurality of inspecting units 24.1 to 24.*m* (when simply referring to any one of the inspecting units, the inspecting units will be simply described as the "inspecting unit 24"), and an event processing unit 25. Moreover, in the present embodiment, the respective functions of the network monitoring device 20 are executed by the CPU 11 that is a general purpose processor. Alternatively, a part of or all of the functions may be executed by one or a plurality of dedicated processors. In addition, a part of or all of the functions may be executed by a device installed at a remote location or by a plurality of devices installed in a distributed manner using cloud technology or the like.

The communication acquiring unit 21 acquires data of communication transmitted and/or received by a terminal connected to a network. Moreover, in the present embodiment, "terminals" to be an object of monitoring and detection by the network monitoring device 20 include the nodes 90 connected to the network segment 2 as well as other devices (nodes belonging to other networks, external servers, and the like) that communicate with the nodes 90 via the router 10.

The flow managing unit 22 identifies a communication flow (hereinafter, also simply referred to as a "flow") to which data acquired by the communication acquiring unit 21 belongs and manages each flow by updating a flow table based on acquired data, an analysis result, and an inspection result each time data belonging to the flow is received. In this case, a flow refers to a unit for identifying transmission or reception of one block of data such as a connection of Transmission Control Protocol (TCP).

Figure 4:
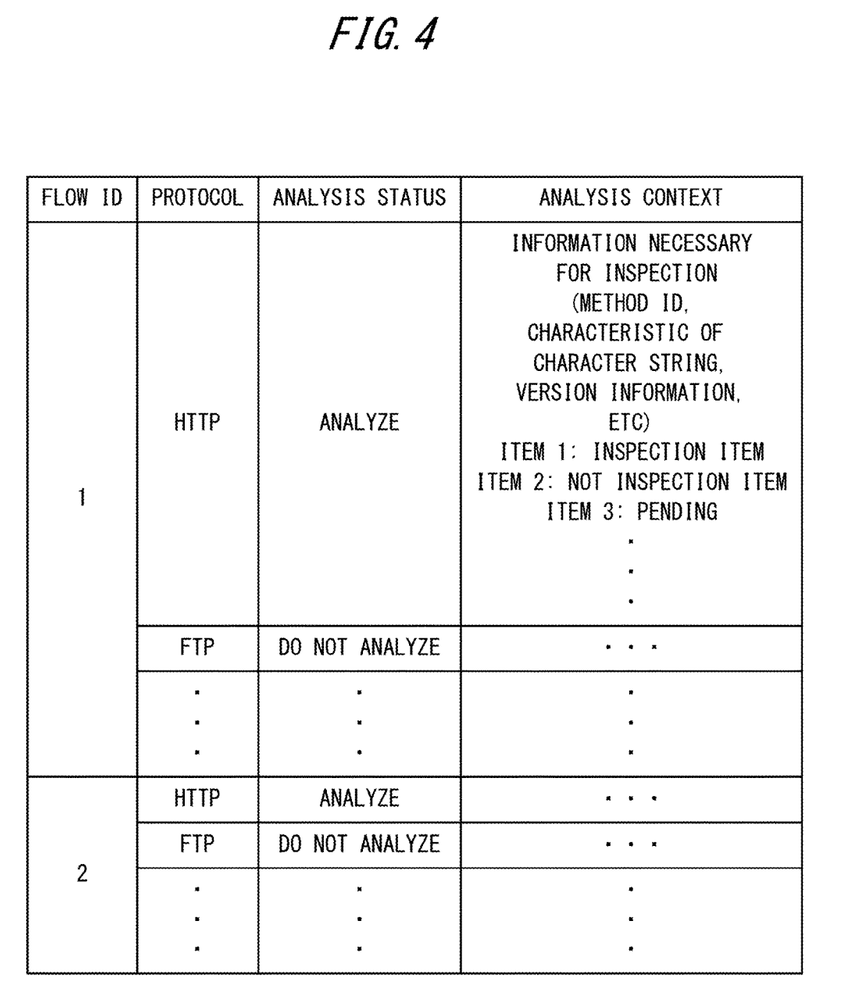
FIG. 4 is a diagram showing an outline of a flow table according to an embodiment.

FIG. 4 is a diagram showing an outline of a flow table according to the present embodiment. For each flow of communication acquired by the network monitoring device 20, the flow table manages information related to the flow (hereinafter, referred to as "flow-related information"). In the present embodiment, a flow is identified by being assigned a flow ID. The flow managing unit 22 can retrieve desired flow-related information from the flow table using a flow ID as a key. In addition, a flow is identified by referring to a protocol number (however, a protocol number may possibly be disguised), a transmission source IP address, a destination IP address, a transmission source port number, a destination port number, and the like that are included in a header of a packet. Therefore, when a packet related to a new flow is received, the flow managing unit 22 collects a flow ID and stores a correspondence relationship between the flow ID and information used for the flow identification described above.

Each piece of flow-related information stores an analysis status representing whether or not each protocol analyzing unit 23 is to continue analyzing data with respect to a flow with which the protocol analyzing unit 23 is associated and an analysis context. Either "analyze" or "do not analyze" is set as the analysis status. An initial value of the analysis status is "analyze". In addition, the analysis context stores information required by the inspecting unit 24 related to the protocol and the flow to perform an inspection and an inspection status thereof (in the present embodiment, any of "inspection item", "not inspection item", and "pending").

Furthermore, the flow managing unit 22 refers to an analysis result and an inspection result of object data, and when a result of analysis or an inspection of data belonging to the flow satisfies one or any of a plurality of discontinuation conditions, the flow managing unit 22 discontinues analysis of data related to the flow by the protocol analyzing unit 23 having satisfied the discontinuation condition. In this case, the one or the plurality of discontinuation conditions for discontinuing analysis by a protocol analyzing unit 23 includes at least any of completion of inspections with respect to all inspection items related to the protocol in a flow, end of the protocol in the flow, and a failure of interpretation of the flow in terms of the protocol. For example, discontinuation conditions for discontinuing analysis by a Hypertext Transfer Protocol (HTTP) analyzing unit 23.1 includes at least any of completion of inspections with respect to all inspection items related to HTTP in a flow, end of HTTP in the flow (for example, end of a TCP connection), and a failure of interpretation of the flow in terms of HTTP. In addition, for example, discontinuation conditions for discontinuing analysis by a File Transfer Protocol (FTP) analyzing unit 23.4 includes at least any of completion of inspections with respect to all inspection items related to FTP in a flow, end of FTP in the flow (for example, end due to a QUIT command), and a failure of interpretation of the flow in terms of FTP.

Furthermore, when a given protocol analyzing unit 23 detects that a protocol of a given flow has changed to another protocol, the flow managing unit 22 causes analysis of data related to the flow by a protocol analyzing unit 23 in charge of the other protocol to be resumed. For example, when the HTTP analyzing unit 23.1 detects that a flow has changed to another protocol using a CONNECT method, the flow managing unit 22 causes analysis of data related to the flow by other protocol analyzing units 23 including an SSL/TLS (HTTPS) analyzing unit 23.2 and the FTP analyzing unit 23.4 to be resumed.

Furthermore, when a given protocol analyzing unit 23 decides that a protocol of a given flow is a protocol for which the protocol analyzing unit 23 is in charge, the flow managing unit 22 causes analysis of data related to the flow by other protocol analyzing units 23 to be discontinued. For example, when the HTTP analyzing unit 23.1 decides that a protocol of a flow is HTTP, the flow managing unit 22 causes analysis of data related to the flow by an Session Initiation Protocol (SIP) analyzing unit 23.3 to be discontinued.

The protocol analyzing unit 23 is provided for each protocol that is considered to be an object of analysis by the network monitoring device 20 such as the HTTP analyzing unit 23.1, the SIP analyzing unit 23.3, and the FTP analyzing unit 23.4, and analyzes object data in parallel. By analyzing object data in accordance with characteristics of a protocol set in advance each time data belonging to a flow is received, each of the protocol analyzing units 23 estimates whether or not a protocol related to a flow is the protocol set in advance regardless of a result of analysis by another protocol analyzing unit 23. For example, by analyzing object data in accordance with characteristics of HTTP each time data belonging to a flow is received, the HTTP protocol analyzing unit 23.1 estimates whether or not a protocol related to a flow is HTTP regardless of a result of analysis by the SIP analyzing unit 23.3, the FTP analyzing unit 23.4, and the like.

When the protocol analyzing unit 23 determines that a protocol related to a flow is a protocol for which the protocol analyzing unit 23 is in charge, the inspecting unit 24 inspects the data in accordance with inspection items determined in accordance with the protocol. For example, when the HTTP analyzing unit 23.1 determines that a protocol related to a flow is HTTP, an HTTP inspecting unit 24.1 inspects the data according to inspection items determined with respect to HTTP.

When an event in a flow is detected by the protocol analyzing unit 23 or the inspecting unit 24, the event processing unit 25 stores data (a trail) related to the event or notifies a user of the detection of the event. Examples of an event that is detected in the present embodiment include communication on the network by an application that is not required when conducting business, a communication not conforming to a protocol, and communication performed by malware.

<Flow of Processes>

Next, a flow of processes executed by the system 1 according to the present embodiment will be described with reference to flow charts. It is to be understood that specific contents and specific sequences of processes shown in the flow charts described below merely represent one example of implementing the present disclosure. Specific contents and sequences of the processes may be appropriately selected in accordance with embodiments of the present disclosure.

Figure 5:
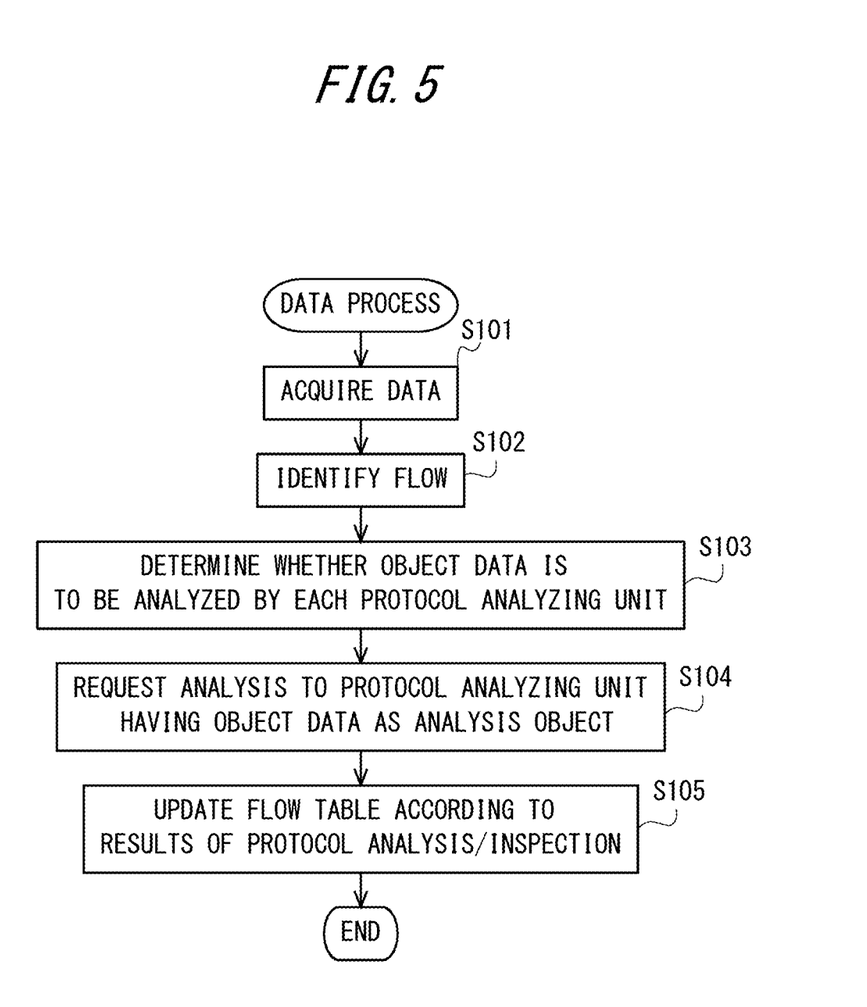
FIG. 5 is a flow chart showing an outline of a flow of a data process according to an embodiment.

FIG. 5 is a flow chart showing an outline of a flow of a data process according to the present embodiment. The data process according to the present embodiment is executed every time data flowing through the network is acquired by the network monitoring device 20. Moreover, in the present embodiment, when data is divided into a plurality of packets, the data process is executed every time a prescribed unit of data is acquired by receiving a plurality of packets. Alternatively, the process shown in the present flow chart may be executed each time a packet is received.

In steps S101 and S102, data is acquired and a flow related to object data is identified. The communication acquiring unit 21 acquires data flowing through the network (step S101). At this point, when the data is divided into a plurality of packets, the communication acquiring unit 21 acquires the prescribed unit of data by waiting for a plurality of divided packets to be received. Once data is acquired, the flow managing unit 22 identifies a flow related to the object data by referring to a header or the like of a packet including the object data (step S102).

More specifically, when communication (an input packet) is newly acquired by the communication acquiring unit 21, the flow managing unit 22 shapes the input packet, classifies the input packet, and associates the input packet with a valid existing flow. In addition, the network monitoring device 20 classifies the input packet in terminal units (units of transmission source/destination IP addresses (MAC addresses)), classifies the input packet in units of transport layer protocols (TCP, UDP, ICMP, and the like), and associates the input packet with an existing flow. Furthermore, by referring to a flow table, the flow managing unit 22 acquires information related to the identified flow. Subsequently, the process proceeds to step S103.

In step S103, a determination is made on whether or not the object data is an object of analysis by each protocol analyzing unit 23. In the present embodiment, a plurality of protocol analyzing units 23 are provided for each protocol that is an object of analysis. By referring to a flow table, the flow managing unit 22 determines whether or not object data is an object of analysis by each protocol analyzing unit 23. Specifically, the flow managing unit 22 determines whether or not object data is an analysis object by determining whether an analysis status of each protocol of a flow to which the object data belongs is set to "analyze" or "do not analyze". Moreover, when the object data is data of the flow of second and subsequent times, any value in accordance with a result of a protocol analysis/inspection of a previous time is set as the analysis status (refer to step S105). When the object data is data of the flow of the first time, "analyze" that is an initial value is set as the analysis status. Subsequently, the process proceeds to step S104.

In step S104, a protocol analysis is requested to a necessary protocol analyzing unit 23. The flow managing unit 22 calls a protocol analyzing unit 23 for which a flow of the object data is set as an object of analysis and requests that the protocol analyzing unit 23 perform a protocol analysis of the object data. Details of an analysis process by the protocol analyzing unit 23 will be described later with reference to a flow chart (FIG. 6) showing an outline of a flow of a protocol analysis/inspection process. When processing is returned from all of the requested protocol analyzing units 23, the process advances to step S105.

In step S105, a flow table is updated. When processing by each protocol analyzing unit 23 is finished, the flow managing unit 22 updates the analysis status of the flow table in accordance with a result of a protocol analysis/inspection process (contents set by each protocol analyzing unit 23 instep S210 to be described later) and waits for data of a next time. Specifically, the flow managing unit 22 updates an analysis status for the protocol of the flow to "analyze" with respect to a protocol analyzing unit 23 which is set so as to continue analysis of the flow and updates an analysis status for the protocol of the flow to "do not analyze" with respect to a protocol analyzing unit 23 which is set so as to discontinue analysis of the flow. Subsequently, the process shown in the present flow chart is finished.

Figure 6:
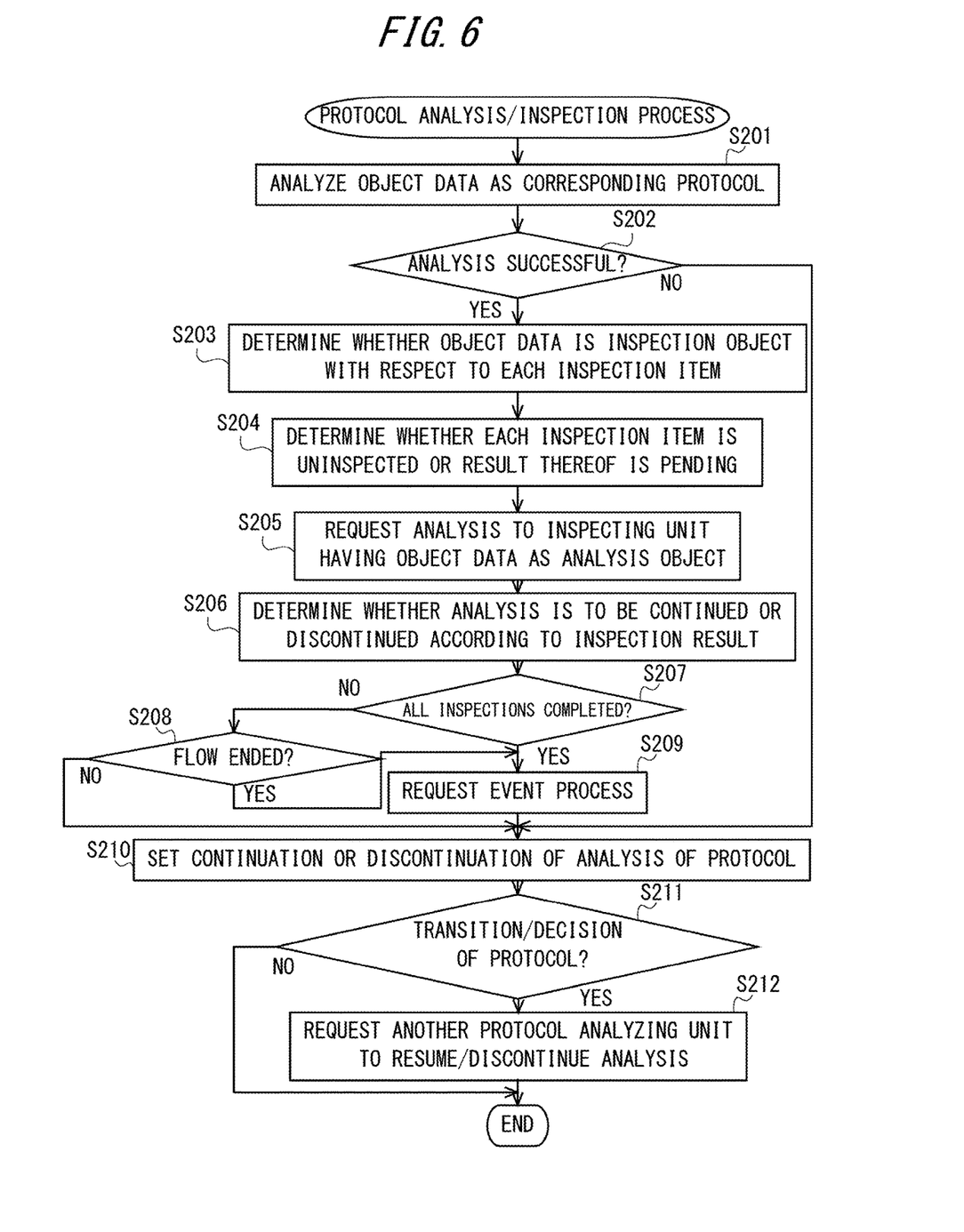
FIG. 6 is a flow chart showing an outline of a flow of a protocol analysis/inspection process according to an embodiment.

FIG. 6 is a flow chart showing an outline of a flow of a protocol analysis/inspection process that is executed for each protocol defined in advance according to the present embodiment. The protocol analyzing unit 23 and the inspecting unit 24 are provided for each protocol. The protocol analysis/inspection process according to the present embodiment is executed each time the protocol analyzing unit 23 for each protocol is called in the data process. In other words, in the present embodiment, for each protocol such as HTTP, FTP, and SSL/TLS, a protocol analyzing unit 23 corresponding to each protocol is provided such as the HTTP analyzing unit 23.1, the FTP analyzing unit 23.4, and the SSL/TLS analyzing unit 23.2. In addition, for each protocol, an inspecting unit 24 corresponding to each protocol is provided such as the HTTP inspecting unit 24.1, the FTP inspecting unit 24.4, and the SSL/TLS inspecting unit 24.2. Each time data is acquired, the protocol analyzing units 23.1 to 23.*n* and the inspecting units 24.1 to 24.*m* are called and are executed in parallel. As a result, a protocol analysis/inspection process for each protocol is executed with respect to one piece of data.

In step S201, analysis (parsing) is performed on whether or not object data is a relevant protocol. Each protocol analyzing unit 23 refers to the object data and performs analysis necessary for each protocol such as a data parsing process and transaction management. Specifically, the analysis is performed by comparing the object data with a data pattern of a protocol defined in advance. In doing so, the protocol analyzing unit 23 according to the present embodiment analyzes whether or not the object data is a protocol for which the protocol analyzing unit 23 is in charge by also considering the possibility that a protocol number and the like set to a packet header have been disguised instead of relying exclusively on a protocol number.

For example, by analyzing the object data to be a protocol for which the protocol analyzing unit 23 is in charge and determining whether or not the object data includes elements essential for the object data to constitute data of the protocol, each protocol analyzing unit 23 analyzes whether or not the object data is the protocol. However, methods used to analysis a protocol are not limited to the example according to the present disclosure. For example, whether or not the object data is a protocol for which the protocol analyzing unit 23 is in charge may be analyzed using a method in which points with respect to consistencies and inconsistencies with a data pattern of a protocol related to the protocol analyzing unit 23 are accumulated and the points are compared with a threshold to determine a resemblance of previously received object data to the protocol. Information obtained as a result of the analysis (for example, the points described above) is handed over to the flow managing unit 22 and stored in an analysis context in the flow table updating process in step S105 described earlier. Moreover, when the object data is data of the flow of second and subsequent times or, in other words, when the protocol analyzing unit 23 has previously analyzed data related to the flow, analysis contexts of the analyses of the previous and earlier times are referred to in addition to the object data when performing the present analysis. Subsequently, the process proceeds to step S202.

In step S202, a result of the protocol analysis is determined. As a result of the protocol analysis in step S201, when it is determined that the protocol of the object data is a protocol that is an object of the protocol analyzing unit 23 (for example, when the HTTP analyzing unit 23.1 determines that the object data is data of HTTP), the process advances to step S203. On the other hand, as a result of the protocol analysis, when it is determined that the protocol of the object data is not a protocol that is an object of the protocol analyzing unit 23, the process advances to step S210.

In steps S203 and S204, a determination is made on whether or not the object data is an object of an inspection according to a plurality of inspection rules provided in advance with respect to the protocol. By referring to an analysis context in a flow table with respect to object data determined to be the protocol as a result of the protocol analysis, each protocol analyzing unit 23 identifies an inspection item which can be inspected in accordance with the progress of the analysis and whose inspection result is unclear. Specifically, for each inspection item set in advance with respect to the protocol, when object data can be inspected due to reasons such as the object data corresponding to a stage in the flow at which inspection items can be inspected (step S203) and, at the same time, an inspection has not been performed with respect to the inspection item or a result of an inspection with respect to the inspection item is "pending" (step S204), the protocol analyzing unit 23 determines that the object data can be inspected with respect to the inspection item. Subsequently, the process proceeds to step S205.

In step S205, each inspecting unit 24 is requested to perform an inspection. Each protocol analyzing unit 23 issues a request to an inspecting unit 24 with respect to the inspection item identified in steps S203 and S204. Each inspecting unit 24 having received the inspection request performs an inspection with respect to the inspection item based on the analysis result and feeds back an inspection result to the protocol analyzing unit 23. Moreover, inspections with respect to respective inspection items by the inspecting units 24 are processed in parallel. The inspection result to be fed back is any of "inspection item", "not inspection item", and "pending". In this case, "pending" signifies that a conclusion of the inspection was not reached with data received up to the present point. Subsequently, the process proceeds to step S206.

In step S206, continuation/discontinuation of analysis for each protocol is decided according to a result of the feedback. Each protocol analyzing unit 23 aggregates inspection results feedback from the respective inspecting units 24 that had been requested to perform the inspections and decides whether to continue or discontinue the analysis and the inspection of the protocol for which the protocol analyzing unit 23 is in charge. Subsequently, the process proceeds to step S207.

Specifically, for example, when there is an inspection item for which a conclusion has not been reached with respect to the protocol or, in other words, when there is an inspection item for which a result of an inspection is "pending" or an inspection thereof has not been performed, a decision is made to continue the analysis and the inspection of the protocol. In other words, as long as there are inspection items whose inspection result is "pending", the protocol analyzing unit 23 continues analysis of a next piece of data. However, when the protocol analyzing unit 23 detects an end as far as an interpretation of the protocol is concerned, the analysis of the flow by the protocol analyzing unit 23 is ended even if "pending" inspection items remain.

In addition, for example, when conclusions of all inspection items are reached with respect to the protocol or, specifically, when feedbacks of "inspection item" or "not inspection item" are obtained for all inspection items and there are no more "pending" or uninspected inspection items, a decision is made to discontinue the analysis and the inspection of the protocol.

From step S207 to step S209, an event process is performed with respect to a flow for which analysis by the protocol analyzing unit 23 has been completed. Specific determination criteria are similar to the criteria applied when deciding a continuation/discontinuation of analysis in step S206. In other words, with respect to a flow to which the object data belongs, when it is determined that all inspections related to the protocol have been completed (there are no incomplete inspection items) (YES in step S207) or when it is determined that a procedure (flow) or the like of the protocol has ended (YES in step S208), an event process is performed. When there is an event to be processed based on inspection results, each protocol analyzing unit 23 requests the event processing unit 25 to process the event (step S209).

Upon receiving the request for processing, the event processing unit 25 performs processes such as storing a trail and notifying an administrator. Subsequently, the process proceeds to step S210. For example, when it is determined that a terminal is engaging in illegal activity as a result of the inspection, the event processing unit 25 may block communication by the terminal. Moreover, countermeasures to be taken upon a determination that a terminal is engaging in illegal activity are not limited to blocking communication. When it is determined that a terminal is engaging in illegal activity, the network monitoring device 20 may perform an alert (warning) notification or may heal the terminal engaged in the illegal activity (by removing malware or eliminating vulnerability).

In step S210, a continuation/discontinuation of analysis is set for each protocol. In accordance with a result of the decision in step S206, with respect to the protocol, the protocol analyzing unit 23 sets a continuation of analysis in anticipation of a next piece of data or sets a discontinuation of analysis. In addition, when it is determined that analysis by the protocol analyzing unit 23 has failed in step S202, the protocol analyzing unit 23 determines that the protocol does not correspond to its own protocol and decides a discontinuation of analysis of next and subsequent pieces of data. Subsequently, the process proceeds to step S211.

In steps S211 and S212, when a transition or a decision of a protocol is detected, a resumption/discontinuation request is issued to other protocol analyzing units 23. As described earlier, when a given protocol analyzing unit 23 discontinues analysis on a given flow, data belonging to the flow of next and subsequent times is not considered an analysis object of the protocol analyzing unit 23. Therefore, when a transition from a protocol for which analysis is ongoing to another protocol occurs in a single flow, in the present embodiment, the protocol analyzing unit 23 having detected the transition between protocols requests another protocol analyzing unit 23 to resume the analysis.

On the other hand, when a plurality of protocol analyzing units 23 related to protocols with similar formats are continuing analyses in an overlapping manner, even when a given protocol analyzing unit 23 decides that the protocol of the flow is a protocol for which the protocol analyzing unit 23 is in charge, there is a possibility that other protocol analyzing units 23 may continue their analyses. Therefore, in the present embodiment, the protocol analyzing unit 23 capable of identification with higher reliability requests other protocol analyzing units 23 to discontinue the analyses by the protocol analyzing units 23. Subsequently, the process shown in the present flow chart is finished and processing returns to step S105 of the data process (refer to FIG. 5).

Figure 7:
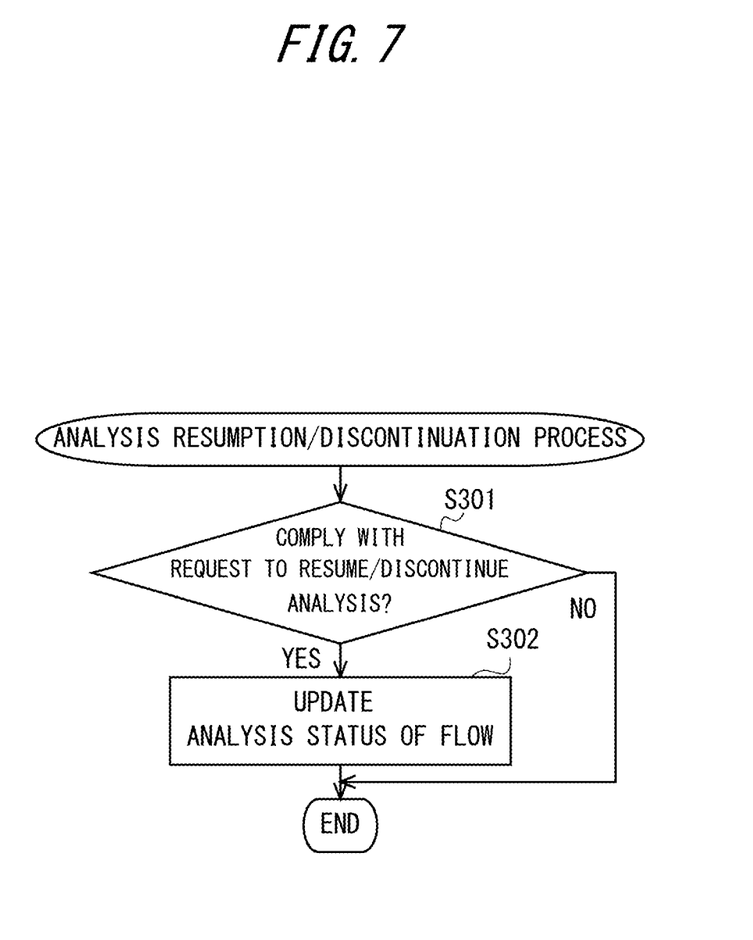
FIG. 7 is a flow chart showing an outline of a flow of an analysis resumption/discontinuation process according to an embodiment.

FIG. 7 is a flow chart showing an outline of a flow of an analysis resumption/discontinuation process according to the present embodiment. The process shown in the present flow chart is executed by each protocol analyzing unit 23 upon reception by each protocol analyzing unit 23 of a request to resume/discontinue analysis (refer to step S212) which is issued by another protocol analyzing unit 23.

The protocol analyzing unit 23 having received a request to resume/discontinue analysis determines whether or not to comply with the request (step S301). When a determination is made to comply with the request to resume the analysis, the protocol analyzing unit 23 decides to resume analysis in anticipation of a next piece of data (step S302). In addition, when complying with the request for discontinuing analysis, the protocol analyzing unit 23 decides to discontinue the analysis (step S302). Subsequently, the process shown in the present flow chart is finished and processing returns to step S105 of the data process (refer to FIG. 5).

When a resumption of the analysis is decided in step S302, the flow managing unit 22 updates the analysis status related to the protocol of the flow in the flow table to "analyze" (step S105). In addition, when a discontinuation of the analysis is decided in step S302, the flow managing unit 22 updates the analysis status related to the protocol of the flow in the flow table to "do not analyze" (step S105).

EXAMPLE 1

An example of a case in which identification and inspection of HTTP communication are performed by the network monitoring device 20 according to the present embodiment will now be described. First, when communication starts as the node 90 and a server perform a TCP 3-way handshake, the flow managing unit 22 identifies the start of communication and a communication flow between the node 90 and the server is registered in a flow table. Subsequently, when the network monitoring device 20 acquires a GET request issued by the node 90, the flow managing unit 22 identifies the flow and refers to the flow table. A data analysis flag is set for each protocol of the protocol analyzing unit 23 in the flow table and an initial value thereof is "analyze". Therefore, the flow managing unit 22 causes each protocol analyzing unit 23 to analyze data to start analysis by referring to reception data and to an analysis context.

For example, the HTTP analyzing unit 23.1 interprets a head character string GET of data as a GET method, interprets a character string following a space as URI, and interprets a segment from a subsequent space to a line break as an HTTP character string. The analysis result is stored in the analysis context. When there is an HTTP inspection item that refers to a method, a URI, or a version and if an inspection result is not decided, a request to perform an inspection is made to the HTTP inspecting unit 24.1 and an inspection is performed.

The HTTP inspecting unit 24.1 refers to the analysis context and performs an inspection based on the inspection item. While an inspection result is stored in the analysis context, "pending" is adopted as the inspection result if progress of the protocol analysis is insufficient and a conclusion is not reached, in which case data of next and subsequent times is awaited. When "pending" is included in the inspection result of the HTTP inspecting unit 24.1 or when there is an uninspected item, the HTTP analyzing unit 23.1 continues analysis since data of next and subsequent times is required for inspection. Meanwhile, for example, since an expected SMB magic is not present and the data cannot be interpreted, an SMB analyzing unit 23.5 determines analysis to be a failure and discontinues the analysis.

EXAMPLE 2

Next, an example of a case in which an inspection with respect to "inspection item X: whether or not a Host header is set when communication is HTTP/1.1 communication" is executed by the network monitoring device 20 according to the present embodiment will be described.

When a first piece of acquired data is "GET/HTTP/1.1" and a second piece of acquired data is "Host: aaa.bbb.ccc", the HTTP analyzing unit 23.1 analyzes the first piece of data. The analysis is successful with respect to a method, a URI, and a version, which are stored in an analysis context. While the HTTP inspecting unit 24.1 performs an inspection with respect to the inspection item X by referring to the analysis context, since information on a Host header is not available at this point, a conclusion of the inspection cannot be reached. Therefore, "pending" is adopted as an inspection result and data of a next time is awaited. Since the inspection result is "pending", the HTTP analyzing unit 23.1 updates a flow table to "analyze".

Next, the second piece of data is analyzed by the HTTP analyzing unit 23.1, which discovers that a Host header exists in addition to a method, a URI, and a version. The information is stored in the analysis context. With respect to the inspection item X, the HTTP inspecting unit 24.1 refers to the analysis context and determines an inspection result thereof to be the "inspection item X" by confirming that the communication is an HTTP/1.1 communication and that a Host header has been set.

On the other hand, when the first piece of acquired data is "GET/HTTP/1.0", while the HTTP analyzing unit 23.1 analyzes the first piece of data and the analysis is successful with respect to a method, a URI, and a version, since the version of the HTTP is 1.0, the HTTP inspecting unit 24.1 determines that the inspection item X is "not inspection item X" based on the first piece of data. In addition, since the HTTP analyzing unit 23.1 need not continue analysis if the inspection item X is the only inspection item, subsequent analysis is discontinued.

EXAMPLE 3

Next, an example of a case will be described in which the network monitoring device 20 according to the present embodiment acquires data of a communication flow in which the node 90 transmits a request using a CONNECT method of HTTP, receives a "200 Connection Established response" from a proxy server, and starts an HTTPS communication using a tunnel.

Since the HTTP analyzing unit 23.1 is able to interpret the CONNECT method using a first piece of acquired data of a flow, analysis is continued. Since other protocol analyzing units 23 such as the SSL/TLS analyzing unit 23.2 cannot interpret the format of the CONNECT request in accordance with their own protocols, their analyses fail and subsequent analyses are discontinued. Next, as the "200 response" is received by the network monitoring device 20, the data is analyzed by the HTTP analyzing unit 23.1 which had succeeded in analysis of a previous time and whose analysis is ongoing.

In this case, the "200 response" indicates that the CONNECT method is successful and shows that, subsequently, the proxy server is to act as a tunnel and communication by any protocol can be performed. Therefore, the HTTP analyzing unit 23.1 requests the other protocol analyzing units 23 that had discontinued their analyses to resume the analyses. Each protocol analyzing unit 23 having accepted the resumption request resumes analysis for data of next and subsequent times. At this point, when the tunnel communication is HTTPS, the next piece of data is "Client Hello". The SSL/TLS analyzing unit 23.2 having resumed the analysis succeeds in analysis of the data and subsequently continues the analysis. On the other hand, since analyses by the HTTP analyzing unit 23.1 and other protocol analyzing units 23 fail, subsequent analyses are discontinued.

<Variations>

In the embodiment presented above, an example is described in which, by being connected between a switch or a router and an upper-level switch or router, the network monitoring device 20 runs in an in-line mode to acquire a packet, a frame, or the like that is transmitted and/or received by the node 90 and transfer packets that need not be blocked (refer to FIG. 1). However, the network configuration presented in the embodiment described above is simply an example of implementing the present disclosure and other network configurations may be adopted to implement the present disclosure.

Figure 8:
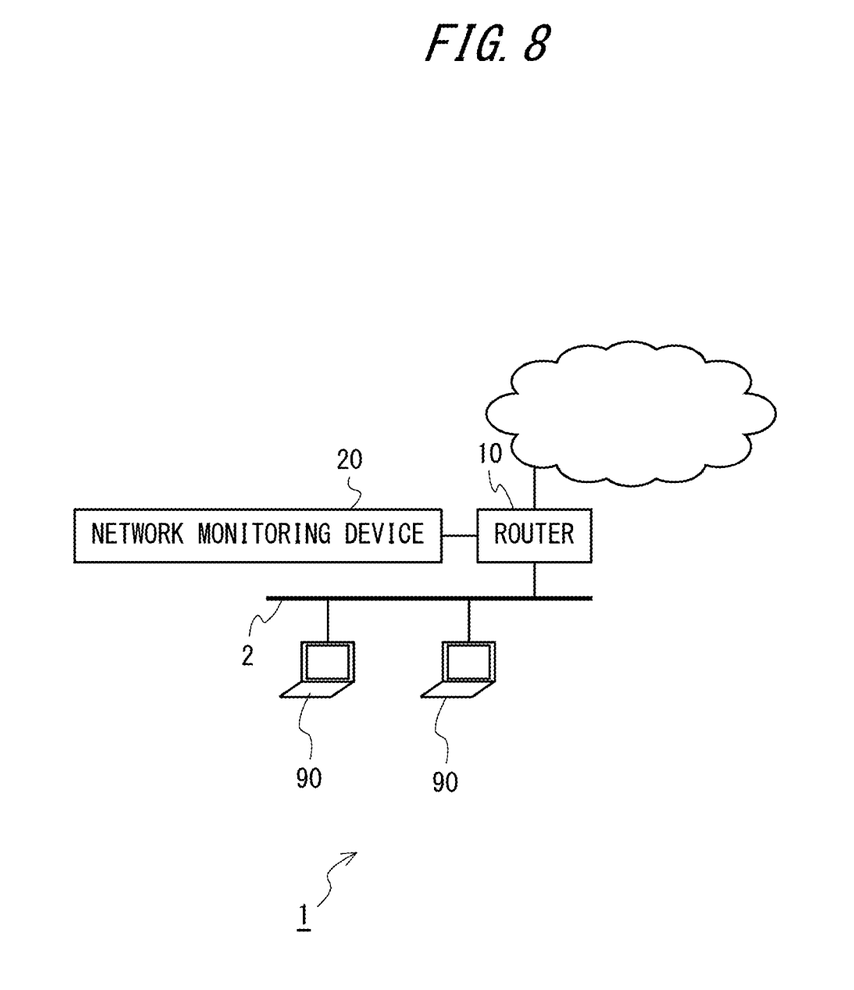
FIG. 8 is a schematic diagram showing a variation of a configuration of a system according to an embodiment.

For example, the network monitoring device 20 may acquire a packet, a frame, or the like that is transmitted and/or received by the node 90 by being connected to a monitoring port (mirror port) of a switch or a router (router 10 in the example shown in FIG. 1) (refer to FIG. 8). In this case, the network monitoring device 20 runs in a passive mode in which acquired packets are not transferred. Alternatively, for example, even if the network monitoring device 20 is not connected to a monitoring port (mirror port) and is simply connected to the network segment 2, by acquiring all frames flowing through the network segment 2 including those not addressed to the MAC address of the network monitoring device 20, the network monitoring device 20 can acquire a packet, a frame, or the like that is transmitted and/or received by the node 90. Even in this case, the network monitoring device 20 runs in a passive mode. Alternatively, for example, the network monitoring device 20 may be included in a router or a switch.

<Advantageous Effects>

With the information processing device, the method, and the program according to the present embodiment, a protocol determination in real time with higher accuracy can be performed. In addition, according to the present embodiment, since reception data need not be accumulated until a protocol can be uniquely identified, a highly accurate protocol determination can be performed with a smaller amount of accumulated data.

What is claimed is:

1. An information processing device comprising one or plural processing circuitries, said one or plural processing circuitries execute:

flow managing to identify a communication flow to which acquired data belongs;

first analyzing to estimate whether or not a protocol related to the communication flow is a first protocol set in advance by analyzing, each time data belonging to the communication flow is received, the data in accordance with characteristics of the first protocol;

second analyzing to estimate whether or not the protocol related to the communication flow is a second protocol which is set in advance and different from the first protocol by analyzing, each time data belonging to the communication flow is received, the data in accordance with characteristics of the second protocol regardless of a result of analysis by the first analyzing;

first inspecting to inspect the data according to inspection items determined in accordance with the first protocol, when the protocol related to the communication flow is determined to be the first protocol by the first analyzing; and second inspecting to inspect the data according to inspection items determined in accordance with the second protocol, when the protocol related to the communication flow is determined to be the second protocol by the second analyzing, wherein when a result of analysis or an inspection of the data belonging to the communication flow satisfies one or any of a plurality of discontinuation conditions, the flow managing discontinues analysis of data related to the communication flow performed by the first analyzing or the second analyzing even before the first analyzing or the second analyzing completes analysis of data related to the communication flow identified by the flow managing, the one or any of the plurality of discontinuation conditions for discontinuing analysis by the first analyzing includes at least any of completion of inspections with respect to all inspection items related to the first protocol in the communication flow, an end of the first protocol in the communication flow, and a failure of an interpretation as the first protocol of the communication flow, the one or any of the plurality of discontinuation conditions for discontinuing analysis by the second analyzing includes at least any of completion of inspections with respect to all inspection items related to the second protocol in the communication flow, an end of the second protocol in the communication flow, and a failure of an interpretation as the second protocol of the communication flow, and the result of the inspection of the data belonging to the communication includes an inspection item, a not inspection item, and a pending item, the pending item indicating that the completion of inspection is not reached with data received up to the present point.

2. The information processing device according to claim 1, wherein
the flow managing stores an analysis result by the first analyzing and an analysis result by the second analyzing and updates the analysis results each time data belonging to the communication flow is received.

3. The information processing device according to claim 2, wherein
the flow managing determines whether or not to discontinue analysis of the data related to the communication flow performed by the first analyzing or the second analyzing by referring to the stored analysis results.

4. The information processing device according to claim 1, wherein
the flow managing causes the second analyzing to resume analysis of the data related to the communication flow when the first analyzing detects a transition of the protocol of the communication flow to the second protocol, and
the flow managing causes the first analyzing to resume analysis of the data related to the communication flow when the second analyzing detects a transition of the protocol of the communication flow to a protocol other than the second protocol.

5. The information processing device according to claim 1, wherein
the flow managing causes the second analyzing to discontinue analysis of the data related to the communication flow when the first analyzing decides that the protocol of the communication flow is the first protocol, and the flow managing causes the first analyzing to discontinue analysis of the data related to the communication flow when the second analyzing decides that the protocol of the communication flow is the second protocol.

6. The information processing device according to claim 1, said one or plural processing circuitries further executing event processing to, when an event in the communication flow is detected by the analyzing or the inspecting, store data related to the event or notifying a user of detection of the event.

7. The information processing device according to claim 1, said one or plural processing circuitries further executing communication acquiring for acquiring communication by a terminal connected to network.

8. A method causing a computer to execute:
identifying a communication flow to which acquired data belongs;
first analyzing to estimate whether or not a protocol related to the communication flow is a first protocol set in advance by analyzing, each time data belonging to the communication flow is received, the data in accordance with characteristics of the first protocol;
second analyzing to estimate whether or not the protocol related to the communication flow is a second protocol which is set in advance and different from the first protocol by analyzing, each time data belonging to the communication flow is received, the data in accordance with characteristics of the second protocol regardless of a result of analysis in the first analyzing;
first inspecting to inspect the data according to inspection items determined in accordance with the first protocol, when the protocol related to the communication flow is determined to be the first protocol by the first analyzing; and
second inspecting to inspect the data according to inspection items determined in accordance with the second protocol, when the protocol related to the communication flow is determined to be the second protocol by the second analyzing, wherein when a result of analysis or an inspection of the data belonging to the communication flow satisfies one or any of a plurality of discontinuation conditions, analysis of data related to the communication flow in the first analyzing or the second analyzing is discontinued in the identifying even before the first analyzing or the second analyzing completes analysis of data related to the communication flow in the identifying, the one or any of the plurality of discontinuation conditions for discontinuing analysis by the first analyzing includes at least any of completion of inspections with respect to all inspection items related to the first protocol in the communication flow, an end of the first protocol in the communication flow, and a failure of an interpretation as the first protocol of the communication flow, the one or any of the plurality of discontinuation conditions for discontinuing analysis by the second analyzing includes at least any of completion of inspections with respect to all inspection items related to the second protocol in the communication flow, an end of the second protocol in the communication flow, and a failure of an interpretation as the second protocol of the communication flow, and the result of the inspection of the data belonging to the communication includes an inspection item, a not inspection item, and a pending item, the pending item indicating that the completion of inspection is not reached with data received up to the present point.

9. A computer-readable non-transitory medium on which is recorded a program causing a computer to execute:
flow managing to identify a communication flow to which acquired data belongs;
first analyzing to estimate whether or not a protocol related to the communication flow is a first protocol set in advance by analyzing, each time data belonging to the communication flow is received, the data in accordance with characteristics of the first protocol;
second analyzing to estimate whether or not the protocol related to the communication flow is a second protocol which is set in advance and different from the first protocol by analyzing, each time data belonging to the communication flow is received, the data in accordance with characteristics of the second protocol regardless of a result of analysis by the first analyzing;
first inspecting to inspect the data according to inspection items determined in accordance with the first protocol, when the protocol related to the communication flow is determined to be the first protocol by the first analyzing; and
second inspecting to inspect the data according to inspection items determined in accordance with the second protocol, when the protocol related to the communication flow is determined to be the second protocol by the second analyzing, wherein
when a result of analysis or an inspection of the data belonging to the communication flow satisfies one or any of a plurality of discontinuation conditions, the flow managing discontinues analysis of data related to the communication flow performed by the first analyzing or the second analyzing even before the first analyzing or the second analyzing completes analysis of data related to the communication flow identified by the flow managing,
the one or any of the plurality of discontinuation conditions for discontinuing analysis by the first analyzing includes at least any of completion of inspections with respect to all inspection items related to the first protocol in the communication flow, an end of the first protocol in the communication flow, and a failure of an interpretation as the first protocol of the communication flow,
the one or any of the plurality of discontinuation conditions for discontinuing analysis by the second analyzing includes at least any of completion of inspections with respect to all inspection items related to the second protocol in the communication flow, an end of the second protocol in the communication flow, and a failure of an interpretation as the second protocol of the communication flow, and
the result of the inspection of the data belonging to the communication includes an inspection item, a not inspection item, and a pending item, the pending item indicating that the completion of inspection is not reached with data received up to the present point.

\* \* \* \* \*